United States Patent
Dahm et al.

(10) Patent No.: US 9,388,538 B2
(45) Date of Patent: Jul. 12, 2016

(54) FRAME WIDTH ADJUSTMENT BY STEERING

(71) Applicant: Wirtgen GmbH, Windhagen (DE)

(72) Inventors: Martin Dahm, Gieleroth (DE); Ralf Schug, Oberlahr (DE); Cyrus Barimani, Königshwinter (DE); Günter Hähn, Königswinter (DE)

(73) Assignee: Wirtgen GmbH (DE)

( * ) Notice: Subject to any disclaimer, the term of this patent is extended or adjusted under 35 U.S.C. 154(b) by 95 days.

(21) Appl. No.: 14/299,893

(22) Filed: Jun. 9, 2014

(65) Prior Publication Data

US 2015/0354149 A1     Dec. 10, 2015

(51) Int. Cl.
| | | |
|---|---|---|
| E01C 19/00 | (2006.01) | |
| E01C 19/48 | (2006.01) | |
| E01C 7/00 | (2006.01) | |
| E01C 19/50 | (2006.01) | |
| E01C 11/00 | (2006.01) | |
| E01C 19/40 | (2006.01) | |

(52) U.S. Cl.
CPC ................ *E01C 19/4886* (2013.01); *E01C 7/00* (2013.01); *E01C 11/00* (2013.01); *E01C 19/40* (2013.01); *E01C 19/506* (2013.01); *E01C 2301/18* (2013.01)

(58) Field of Classification Search
CPC ....... E01C 7/00; E01C 11/00; E01C 19/4886; E01C 19/506
USPC ..................... 404/84.05–89, 105, 118, 72, 83
See application file for complete search history.

(56) References Cited

U.S. PATENT DOCUMENTS

| | | |
|---|---|---|
| 3,664,448 A | 5/1972 | Hudis |
| 3,792,745 A | 2/1974 | Files |
| 3,970,405 A | 7/1976 | Swisher, Jr. et al. |
| 4,029,165 A | 6/1977 | Miller et al. |
| 4,360,293 A | 11/1982 | Wade |
| 5,590,977 A | 1/1997 | Guntert et al. |
| 6,106,073 A | 8/2000 | Simons et al. |
| 6,390,728 B1 | 5/2002 | Casters |

(Continued)

FOREIGN PATENT DOCUMENTS

| | | |
|---|---|---|
| DE | 19814052 A1 | 10/1999 |
| EP | 0893539 A1 | 1/1999 |
| EP | 1596006 A1 | 11/2005 |

OTHER PUBLICATIONS

Co-pending U.S. Appl. No. 14/540,198 to Dahm et al., entitled "Transport Mode Conversion", filed Nov. 13, 2014, 55 pp. (not prior art).

(Continued)

*Primary Examiner* — Raymond W Addie
(74) *Attorney, Agent, or Firm* — Lucian Wayne Beavers; Patterson Intellectual Property Law, PC

(57) ABSTRACT

A self-propelled construction machine includes machine frame that is laterally extendible to adjust a width of the machine frame. A frame lock can selectively lock and unlock the machine frame to permit the width adjustment. A controller includes a frame extension mode configured to steer at least one ground engaging unit to provide a lateral force to adjust the width of the machine frame as the machine is driven across the ground surface by the ground engaging units.

42 Claims, 12 Drawing Sheets

(56) References Cited

U.S. PATENT DOCUMENTS

| | | | |
|---|---|---|---|
| 6,471,442 | B1 | 10/2002 | Deeb et al. |
| 6,481,923 | B1 | 11/2002 | Casters |
| 6,692,185 | B2 | 2/2004 | Colvard |
| 6,773,203 | B2 | 8/2004 | Casters |
| 6,872,028 | B2 | 3/2005 | Aeschlimann et al. |
| 6,890,123 | B2 | 5/2005 | Piccoli |
| 7,287,931 | B2 | 10/2007 | Anibaldi et al. |
| 7,523,995 | B2 | 4/2009 | Rio et al. |
| 7,942,604 | B2 * | 5/2011 | Willis .................. B62D 7/026 404/83 |
| 8,118,518 | B2 | 2/2012 | Guntert, Jr. et al. |
| 8,459,898 | B2 | 6/2013 | Guntert, Jr. et al. |
| 2003/0180092 | A1 | 9/2003 | Piccoli |
| 2005/0249554 | A1 | 11/2005 | Anibaldi et al. |
| 2011/0194898 | A1 | 8/2011 | Guntert, Jr. et al. |
| 2014/0054950 | A1 | 2/2014 | Berning et al. |
| 2014/0119826 | A1 * | 5/2014 | Graham .................. E01C 19/72 404/75 |

OTHER PUBLICATIONS

Co-pending U.S. Appl. No. 14/299,875 to Dahm et al., entitled "Wing Over Steering", filed Jun. 9, 2014, 55 pp. (not prior art).

Co-pending U.S. Appl. No. 14/299,911 to Dham et al., entitled "Selective Clamping Of Chassis", filed Jun. 9, 2014, 55 pp. (not prior art).

EPO Search report dated Oct. 19, 2015 in European App. No. 15153905.3-1604 corresponding to U.S. Appl. No. 14/299,875 (not prior art), 5 pages.

EPO Search report dated Oct. 19, 2015 in European App. No. 15153903.8-1604 corresponding to U.S. Appl. No. 14/299,911 (not prior art), 5 pages.

EPO Search report dated Oct. 19, 2015 in European App. No. 15153955.8-1604 corresponding to U.S. Appl. No. 14/299,893 (not prior art), 3 pages.

* cited by examiner

FRAME WIDTH ADJUSTMENT BY STEERING

BACKGROUND OF THE INVENTION

1. Field of the Invention

The present invention relates to methods and apparatus for operating self-propelled construction machines, and more particularly, but not by way of limitation, to methods and apparatus for operating slipform paving machines.

2. Description of the Prior Art

Slipform paving machines having a laterally telescoping frame to permit width changes in the paving machine are known. Typically the motive force for collapsing or extending the frame is provided by aligning the tracks or wheels of the machine perpendicular to the operating direction of the machine, and pushing or pulling the frame laterally. This collapsing or expanding force may be aided by hydraulic rams oriented perpendicular to the operating direction of the machine.

Another prior art approach was to support the frame of the slipform paving machine from the ground with posts and to collapse or expand the frame solely with the force of the hydraulic rams oriented perpendicular to the operating direction of the machine.

SUMMARY OF THE INVENTION

In one embodiment a construction machine includes a machine frame having a front, a back, a left side and a right side. The machine frame is laterally extendible to adjust a width of the machine frame. The machine includes at least one left side ground engaging unit steerably connected to the left side of the machine frame and at least one right side ground engaging unit steerably connected to the right side of the machine frame. Each of the ground engaging units includes a drive motor configured such that each ground engaging unit is driven across a ground surface by its respective drive motor. A frame lock is configured to selectively lock and unlock the machine frame, such that when the frame lock is locked the machine frame cannot laterally extend, and when the frame lock is unlocked the machine can laterally extend. A controller includes a frame extension mode, the frame extension mode being configured to provide steering of at least one of the ground engaging units to provide a lateral force to adjust the width of the machine frame as the machine is driven across the ground surface by the ground engaging units.

In another embodiment a method is provided of operating a self-propelled construction machine. The machine includes a machine frame, the machine frame being laterally extendible to adjust the width of the machine frame. The machine further includes at least one left side ground engaging unit steerably connected to a left side of the machine frame and at least one right side ground engaging unit steerably connected to a right side of the machine frame. Each of the ground engaging units includes a drive motor. A frame lock is configured to selectively lock and unlock the machine frame. The method comprises:

unlocking the frame lock such that the machine frame can laterally extend and contract; and while the frame lock is unlocked, moving the machine across the ground surface and steering at least one of the left and right ground engaging units such that the frame width changes due to a lateral component of direction of the at least one of the left and right ground engaging units.

In any of the above embodiments the frame extension mode may include a ground engaging unit selection feature allowing an operator to select individual steering control of either of the left and right ground engaging units or synchronous steering control of both the left and right engaging units.

In any of the above embodiments the synchronous steering control of the ground engaging units selection feature may be configured to steer the left and right ground engaging units in opposite directions.

In any of the above embodiments the at least one left side ground engaging unit may include a front and a rear left side ground engaging unit, and the controller may be configured to simultaneously steer the front and rear left side ground engaging units in tandem and in the same direction. The at least one right side ground engaging unit may similarly include a front and a rear right side ground engaging unit, and the controller may be configured to simultaneously steer the front and rear right side ground engaging units in tandem and in the same direction.

In any of the above embodiments the machine may further comprise at least one linear actuator connected to the machine frame and arranged to provide powered lateral extension and retraction of the machine frame to adjust the frame width.

In any of the above embodiments the frame lock may be provided by the linear actuator.

In any of the above embodiments the frame lock may be a separate component from the linear actuator.

In any of the above embodiments the linear actuator may comprise a hydraulic ram including a cylinder and a piston, the piston dividing the cylinder into first and second ends. The machine may further comprise a three-way valve having an extension position, a retraction position, and a blocked position. First and second hydraulic lines may connect the three-way valve to the first and second ends of the cylinder. When the three-way valve is in its blocked position the hydraulic ram is hydraulically blocked from movement.

In any of the above embodiments the controller may be operably associated with the three-way valve and the controller may be configured to affect the movement of the three-way valve between its positions and to control the flow of hydraulic fluid provided to the hydraulic ram via the three-way valve.

In any of the above embodiments the controller may be configured to determine the lateral extension of the machine frame resulting from the steering of the ground engaging units in accordance with an algorithm, and to actively facilitate the lateral extension by controlling the volume of hydraulic fluid provided to the hydraulic ram via the three-way valve.

In any of the above embodiments the controller may be configured to control an absolute magnitude of lateral extension of the frame.

In any of the above embodiments the machine may comprise a hydraulic fluid supply line to the three-way valve and a pressure control valve in the supply line. The controller may be configured to control the pressure of hydraulic fluid provided to the hydraulic ram via the three-way valve.

In any of the above embodiments the machine frame may include male and female laterally telescoping parts of a telescoping frame assembly, and the frame lock may be a separate component from the linear actuator and the frame lock may engage the male and female telescoping parts.

In any of the above embodiments the controller may be configured to control operation of the frame lock.

In any of the above embodiments the at least one left side ground engaging unit may include a front and a rear left side ground engaging unit. The at least one right side ground engaging unit may include a front and a rear right side ground engaging unit. The machine frame may include a left front laterally telescoping frame assembly, a right front laterally telescoping frame assembly, a left rear laterally telescoping frame assembly, and a right rear laterally telescoping frame assembly. The at least one linear actuator may include a left front linear actuator, a right front linear actuator, a left rear linear actuator and a right rear linear actuator.

In any of the above embodiments the machine may include a single linear actuator on either or both sides of the machine frame, with the linear actuator being located midway between front and rear laterally telescoping assemblies.

In any of the above embodiments the frame extension mode may be configured such that upon deactivation of the frame extension mode the frame lock is in its locked position.

In any of the above embodiments the machine frame may include male and female parts of a laterally telescoping frame assembly, and the frame lock may further include a hydraulic cylinder and piston connected between the male and female parts, the piston dividing the hydraulic cylinder into first and second ends. A hydraulic fluid reservoir, and first and second fluid lines connecting the first and second ends of the hydraulic cylinder to the reservoir are provided. First and second bypass valves may be connected to the first and second hydraulic lines, each bypass valve having a blocked position blocking its respective hydraulic line and a bypass position communicating its respective end of the hydraulic cylinder to the reservoir.

In any of the above embodiments the controller may be configured such that the frame extension mode includes a manual sub-mode permitting the ground engaging units to be steered under manual control by a machine operator.

In any of the above embodiments the controller may be configured such that the frame extension mode includes an automatic sub-mode in which the steering is automatically controlled by the controller in response to an operator input corresponding to a desired frame extension.

In any of the above embodiments in the automatic sub-mode the controller may cause the at least one ground engaging unit which is to be steered to be steered in an S-curve along the ground surface beginning parallel to an initial direction of the ground engaging unit that is to be steered, then steering away from and then back toward the initial direction.

In any of the above embodiments the machine may be a slipform paving machine.

In any of the above embodiments the ground engaging units may comprise crawler tracks.

In any of the above embodiments the machine may further include at least one left side steering sensor to detect a steering angle for the at least one ground engaging unit steerably connected to the left side of the machine, and the machine may include at least one right side steering sensor to detect a steering angle for the at least one ground engaging unit steerably connected to the right side of the machine. The controller may be operably associated with the left and right steering sensors to receive input signals from the left and right steering sensors.

In any of the above embodiments the machine may further comprise a frame extension sensor configured to sense an amount of lateral extension of the frame.

In any of the above embodiments the frame extension sensor may be incorporated in the linear actuator.

BRIEF DESCRIPTION OF THE DRAWINGS

In FIG. 2 the left side of the machine is shown in an extended position, and the right side of the machine is shown in a retracted position.

DETAILED DESCRIPTION

Figure 1:
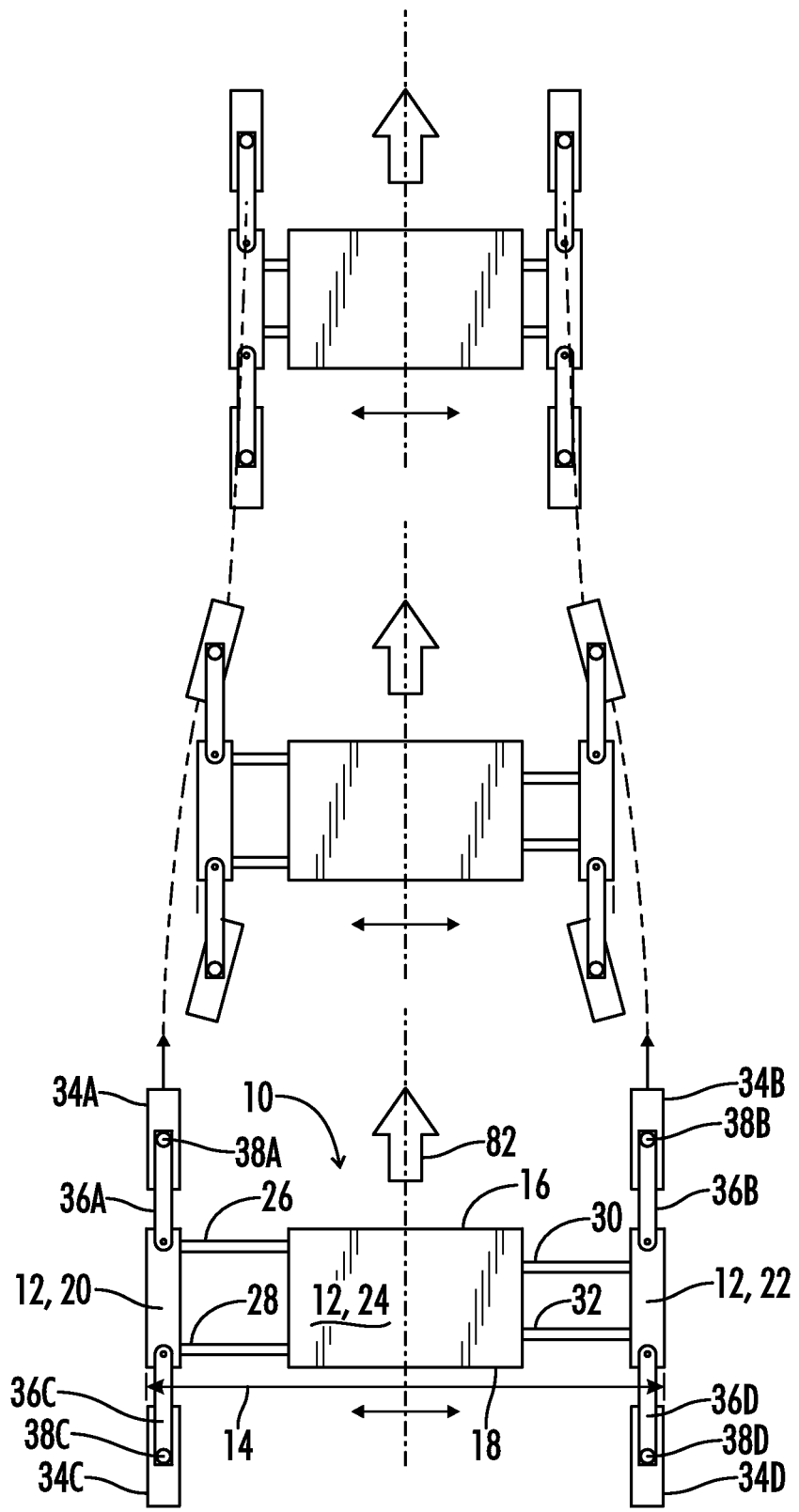
FIG. 1 is a schematic plan view of a self-propelled construction machine as it moves forward from an initial position shown in the lower part of the figure, through an intermediate position, to a final position shown in the upper part of the figure. Both the front and rear tracks on both sides of the machine are steered inwardly toward each other to cause the telescoping frame of the construction machine to contract as the machine moves forward.
Figure 10:
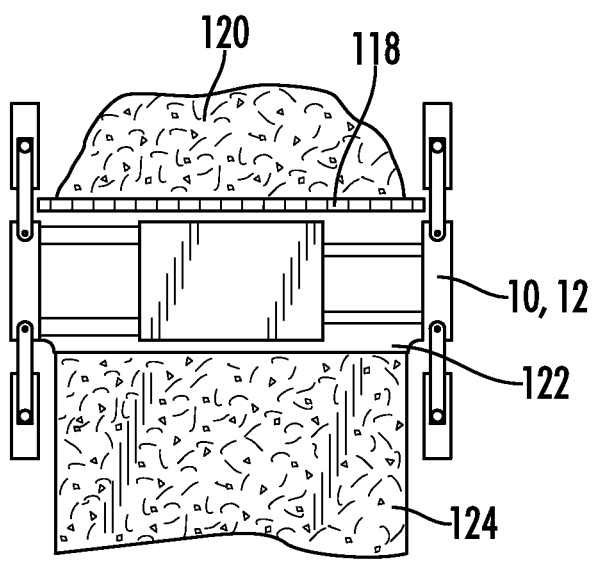
FIG. 10 is a schematic plan view of the construction machine of FIG. 1 embodied as a slipform paving machine.

FIG. 1 schematically illustrates a method of operating a self-propelled construction machine 10. The machine 10 includes a machine frame 12. As schematically illustrated in FIG. 10, the construction machine 10 may be a slip-form paver having a spreader apparatus 118 arranged to engage a mass 120 of concrete which is shaped by form 122 so that a shaped slab 124 of concrete is slip-formed by the machine 10 and exits the rear of the machine 10.

The machine frame 12 is of the type which is laterally extendible to adjust a lateral width 14 of the machine frame. The machine frame 12 has a front 16, a back 18, a left side 20, and a right side 22. The left side 20 and the right side 22 may also be referred to as a left side member 20 and a right side member 22.

The frame 12 includes a main frame module 24. The left side 20 of the frame 12 is connected to the main frame module 24 by left front and left rear telescoping assemblies 26 and 28. The right side 22 of frame 12 is connected to the main frame module 24 by right front and right rear telescoping assemblies 30 and 32. Each of the telescoping assemblies includes a female part and a male part. For the left front telescoping assembly 26 the female part is indicated as 26.1 and the male part is indicated as 26.2. The other telescoping assembly parts are similarly numbered.

As used herein a "telescoping assembly" includes at least two "telescoping parts" which are movable linearly relative to each other. The two telescoping parts may be male and female telescoping parts, such as a smaller tube received in a larger tube. The tubular telescoping parts may have a circular or a rectangular cross-section, or any other suitable cross-section. Or the two telescoping parts can be oriented one beside the other. A telescoping assembly may include more than two telescoping parts. For example a "double telescoping assembly" may include first, second and third telescoping parts, wherein the first part is linearly movable relative to the second part, and the second part is linearly movable relative to the third part. A double telescoping assembly may also be described as two telescoping assemblies in series, wherein the first and second parts make up a first telescoping assembly, and the second and third parts make up a second telescoping assembly.

The machine 10 includes a plurality of ground engaging units 34 including a left front ground engaging unit 34A, a right front ground engaging unit 34B, a left rear ground engaging unit 34C, and a right rear ground engaging unit 34D.

In the embodiment illustrated, the ground engaging units 34 comprise crawler tracks. Alternatively, the ground engaging units 34 could be wheels.

In the embodiment illustrated, each of the ground engaging units 34 is connected to the frame 12 by a respective swing leg 36, which are designated as 36A-36D corresponding to the four ground engaging units. Alternatively, the ground engaging units could be directly connected to side members 20 and 22 of the frame 12.

The frame 12 is vertically supported from each of the ground engaging units 34 by a plurality of lifting columns 38A-38D. As will be understood by those skilled in the art, extension and retraction of the lifting columns 38 can raise and lower the machine frame 12 relative to the ground engaging units 34 and thus relative to the ground surface. Each of the ground engaging units 34 includes a drive motor 40 (see FIG. 4) such that the ground engaging units are driven across the ground surface by the drive motors in a known manner. The drive motor 40 may be either a hydraulic motor or an electric motor.

Figure 4:
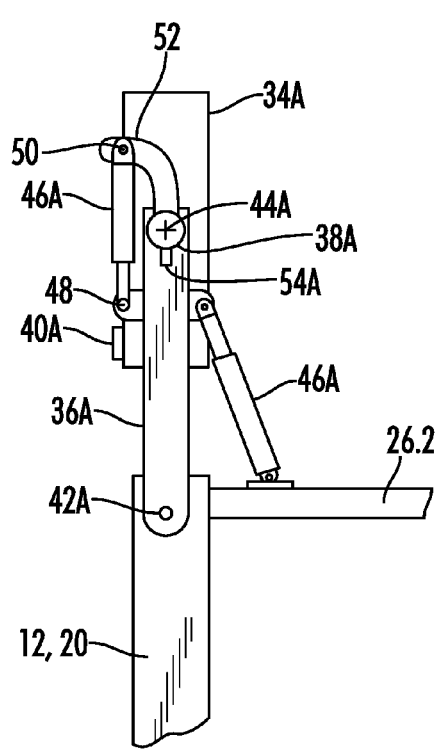
FIG. 4 is a schematic plan view of the left front crawler track as it is connected to the machine frame.

As best seen in FIG. 4, for the embodiment illustrated, each of the swing legs such as 36A is pivotally connected to the machine frame 12 at pivot axis such as 42A. The crawler track or ground engaging unit 34A is steerably connected to the free end of the swing leg 30A and may be steered about a vertical axis 44A of the lifting column 38A.

A holding device 46A such as a hydraulic ram or turnbuckle maintains the pivotal orientation of the swing leg 36A relative to the frame 12.

In the drawings, the swing legs 36 and the holding devices 46 are schematically illustrated as being directly connected to the machine frame 12. It will be understood, however, that the swing legs and holding devices do not have to be directly connected to the machine frame 12. Instead, the swing legs and the holding devices may be indirectly connected to the machine frame 12 by suitable mounting brackets. When one of these components is described herein as being connected to the machine frame, that includes both direct and indirect connections.

Steering of the crawler track 34A relative to the frame 12 about the vertical axis 44A is accomplished by extension and retraction of a hydraulic steering cylinder 46A pivotally connected at 48 to an intermediate location on the swing leg 36A and pivotally connected at 50 to a steering arm 52 connected to rotate with the ground engaging unit or crawler track 34A. Alternatively, instead of the use of a hydraulic ram steering cylinder 46A, the track 34A may be steered relative to the frame 12 by a rotary actuator such as a worm gear or slew gear drive. Also, an electric actuator may be used instead of a hydraulic actuator to steer the crawler track. Each of the crawler tracks 34 may have a steering sensor such as 54A associated therewith, which steering sensors are configured to detect the steering angles of their respective crawler tracks relative to the machine frame 12. The steering sensors associated with the crawler tracks 34A-34D are designated as 54A-54D in the schematic control diagram of FIG. 7. The steering sensors may for example each be an electromagnetic encoder commercially available from TWK-Elektronik GmbH, Heinrichstrasse 85,40239 Düsseldorf, Germany, as TMA 50-S A 180 W S A 16.

Figure 2:
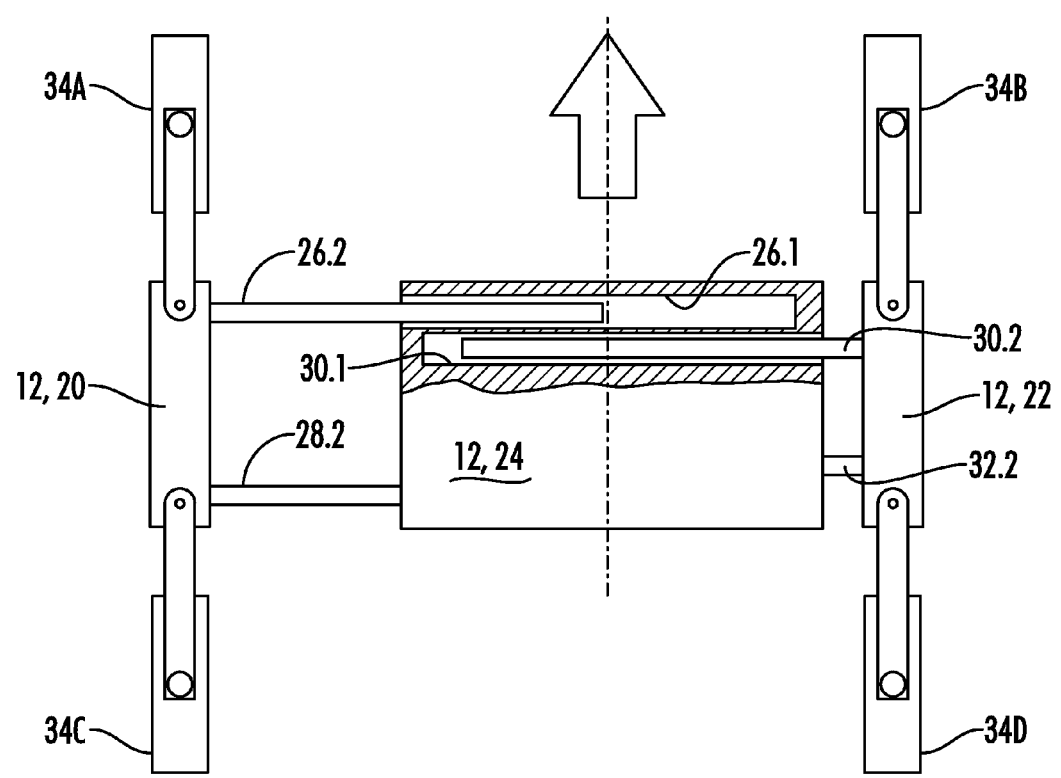
FIG. 2 is an enlarged schematic plan view of the construction machine of FIG. 1, partially cut away to show the front telescoping frame assemblies which allow the frame to extend and contract in lateral width.

Referring now to FIG. 2, an enlarged partially sectioned plan view is there shown of the machine 10. The forward portion of the center frame module 24 has been cut away to illustrate the manner in which the male telescoping assembly parts such as 26.2 and 30.2 are received in complementary sized and shaped female telescoping assembly parts 26.1 and 30.1 of the center module 24. In FIG. 2, the left side 20 of frame 12 is shown in a laterally extended position, and the right side 22 of frame 12 is shown in a laterally retracted position.

Figure 3:
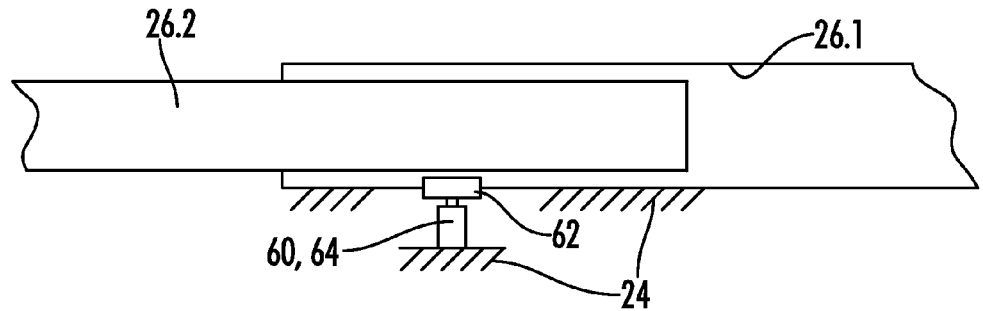
FIG. 3 is a schematic view of a clamping device for locking the male and female parts of one of the telescoping assemblies of the frame in position relative to each other.

FIG. 3 schematically illustrates one embodiment of a clamping device 60 associated with the male part 26.2 and female part 26.1 of the left front telescoping assembly 26 of the machine frame 12. The clamping device 60 includes a clamping member 62 which may be moved by a clamping actuator 64 to engage the male part 26.2 and clamp or hold the male part 26.2 in a fixed position relative to the female part 26.1. The actuator 64 may be electrically or hydraulically or pneumatically operated under control of the control system of FIG. 7, via control line 61. Optionally, the actuator 64 may be a manually operated actuator such as a threaded lead screw or the like.

Figure 7:
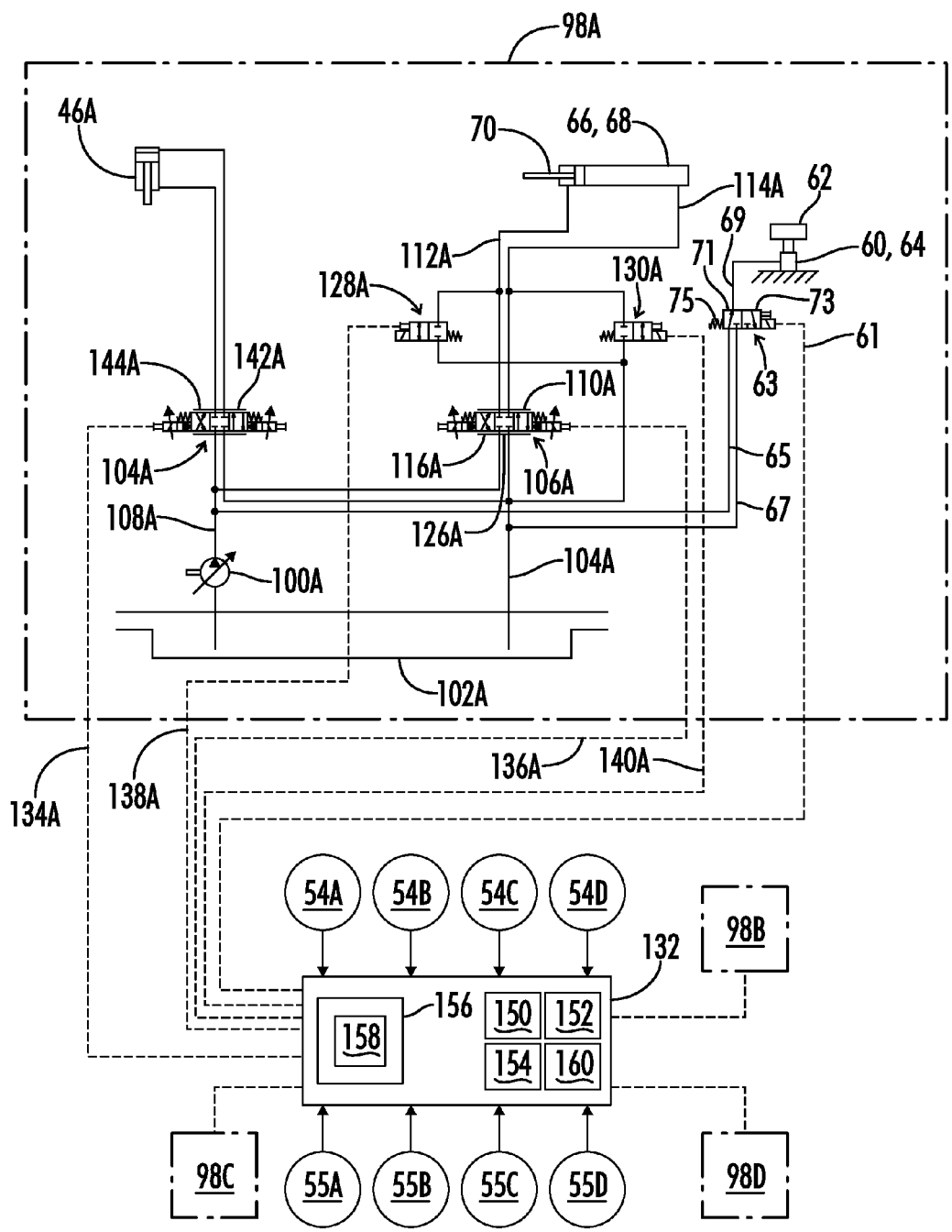
FIG. 7 is a schematic illustration of the hydraulic power system and electronic control system for the steering of the machine and for controlling the lateral extension and retraction of the machine frame.

In FIG. 7 the clamping device 60 is illustrated as including a hydraulic ram type of actuator 64. The control line 61 sends a control signal to a two-way solenoid valve 63 which receives hydraulic fluid under pressure from pump 100A via hydraulic line 65, and which returns fluid to reservoir 102A via hydraulic return line 67. Hydraulic fluid flows between valve 63 and actuator 64 through clamp hydraulic line 69. The valve 63 has a neutral position 71 and a powered position 73. In FIG. 7, the valve 63 is shown in the neutral position 71 wherein there is no electrical power provided to the solenoid valve 63 from line 61, and the neutral position 71 is achieved by the action of the spring 75. In the neutral position shown in FIG. 7 pressurized hydraulic fluid is provided via supply line 65 and clamp hydraulic line 69 to pressurize the ram 64 thereby activating the clamp 62 to lock its associated members in place. When it is desired to de-activate or unlock the clamp 62, an electrical signal is sent to valve 63 via line 61, thus moving the valve 63 to position 73 wherein pressurized fluid in ram 64 is relieved via hydraulic lines 69 and 67 to the reservoir 102A.

The clamping member 62 may be in the form of a clamping pad. It may also be in the form of a clamping wedge or in the form of an annular constricting clamp, or any other suitable construction.

One of the clamping devices 60 may be associated with each of the telescoping assemblies of the frame 12, such that there may be four such clamping devices 60, one associated with each of the telescoping frame assemblies 26, 28, 30 and 32. The clamping devices 60 may be described as telescopic locks for preventing or allowing relative telescoping motion between the parts of each of the telescoping assemblies.

In one embodiment of the frame 12, the male parts of the telescoping assemblies may be freely received in the female parts of the telescoping assemblies as schematically illustrated in FIG. 2, and clamping devices such as device 60 of FIG. 3 may be provided with each telescoping assembly to selectively clamp and unclamp or lock and unlock the telescoping assemblies. It will be appreciated that when the clamping devices 60 are unlocked, the male and female parts of their associated telescoping assemblies may be free to move relative to each other such that the frame width 14 may be changed or adjusted. When the clamping devices 60 are locked, changes in the frame width 14 are prevented.

Figure 3A:
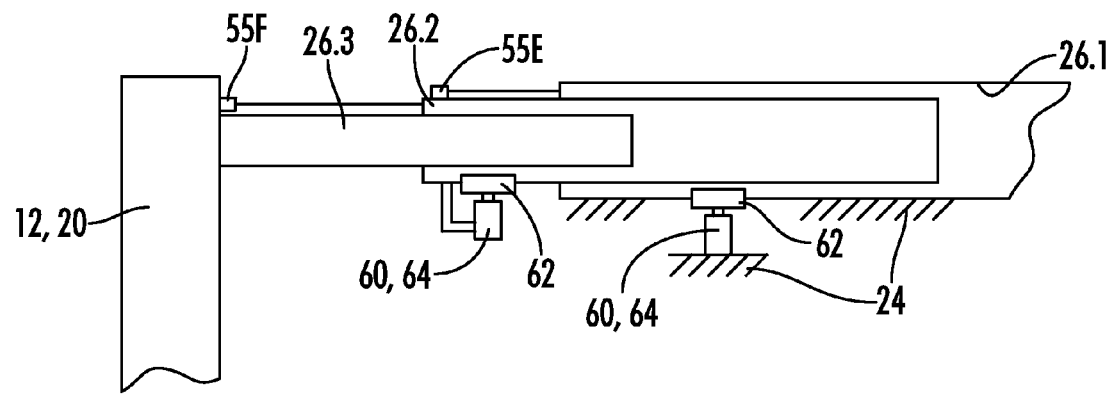
FIG. 3A is a schematic view similar to FIG. 3, showing an alternative double telescoping frame assembly having two clamping devices.

FIG. 3A is a schematic view similar to FIG. 3, showing an alternative double telescoping frame assembly having two clamping devices. The double telescoping frame assembly includes a female part 26.1, an intermediate part 26.2 and a male part 26.3. A first clamping device 60 controls relative movement between parts 26.1 and 26.2 and a second clamping device 60 controls relative movement between parts 26.2 and 26.3. It will be understood that such double telescoping frame assemblies could be substituted for any of the telescoping frame assemblies shown herein.

Figure 6:
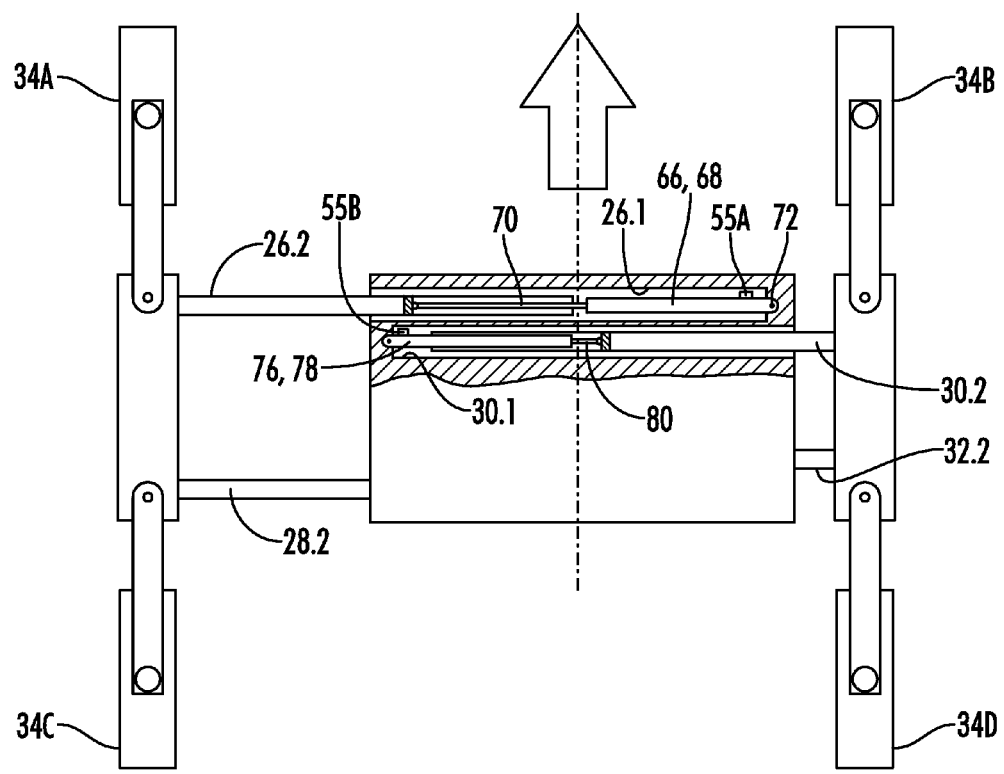
FIG. 6 is a schematic plan view similar to FIG. 2, illustrating hydraulic ram-type actuators for actively facilitating the extension and retraction of the front telescoping assemblies of the machine frame.

The frame 12 may be constructed as shown in FIGS. 2 and 3 without the use of any powered actuators to assist in changing the frame width 14. Optionally, as schematically illustrated in FIG. 6, each telescoping assembly may have associated therewith a linear actuator such as 66 or 76. In one embodiment the linear actuators 66 and 76 may be a hydraulic actuators. In another embodiment, the linear actuators 66 and 76 may be electric actuators.

In the embodiment illustrated in FIG. 6, the linear actuator 66 is a hydraulic actuator including a hydraulic cylinder 68 and a piston 70 extending from the cylinder 68. The hydraulic cylinder 68 is shown attached to the female part 26.1 of left front telescoping frame assembly 26 at 72, and the opposite end of the piston 70 is shown attached to the male part 26.2 at connection 74.

Similarly, the linear actuator 76 including hydraulic cylinder 78 and piston 80 is connected between the male part 30.2 and female part 30.1 of right front telescoping frame assembly 30.

Similar linear actuators are associated with the telescoping frame assemblies 28 and 32.

Each of the linear actuators such as 66 and 76 may have a frame extension sensor such as 55A and 55B associated therewith. The frame extension sensors may be located internal or external of the actuators 66 and 76. External frame extension sensors may for example be wire rope type sensors which include a wire rope that is under tension and capable of being rolled up. Also, as shown in FIG. 6A described below, the frame extension sensors do not have to be associated with the linear actuators.

Figure 6A:
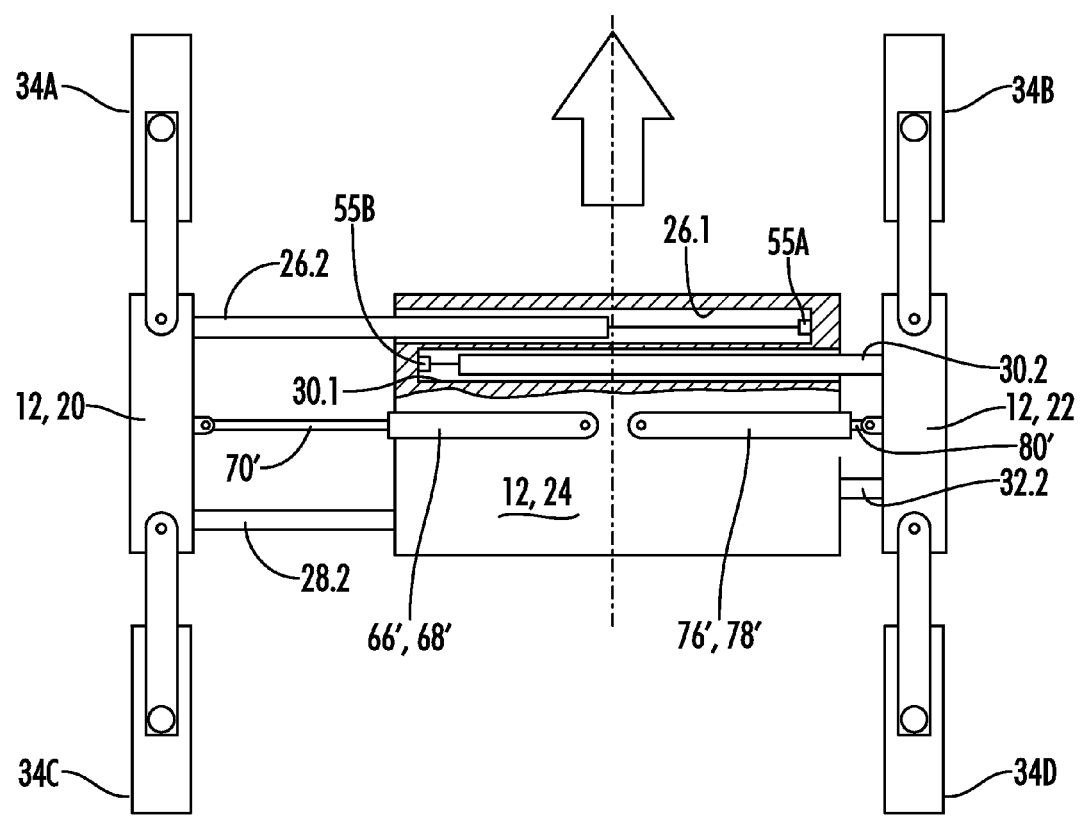
FIG. 6A is a schematic plan view similar to FIG. 6, illustrating an alternative arrangement which has only one hydraulic ram type actuator on each side of the frame, with the actuators being located midway between their respective front and rear telescoping assemblies on each side of the frame.

In the embodiment illustrated in FIG. 6A, an alternative arrangement is shown which has only one hydraulic ram type actuator 66' or 76' on each side of the frame, with the actuators being located midway between their respective front and rear telescoping assemblies on each side of the frame. In the embodiment of FIG. 6A wire rope type frame extension sensors 55A and 55B are shown associated with the left and right front telescoping frame assemblies 26 and 30, respectively.

When the machine 10 is equipped with the linear actuators such as 66 and 76, those linear actuators may be used to actively facilitate the extension and retraction of the machine frame 12 as is further described below. Additionally, those linear actuators may function as a frame lock to either permit or prevent changes in the lateral width of the machine frame. Alternatively, separate frame locks such as the frame locks 60 of FIG. 3 may be used in combination with the linear actuators such as 66 and 76. As schematically illustrated in FIG. 1, the present invention provides a system by which the motive power to laterally expand and retract the frame 12 may be provided by the steering of the left and/or right ground engaging units as the machine moves across the ground surface such that a lateral component of force imposed on the machine frame 12 by the tracks as they are steered provides the lateral force necessary to expand and retract the frame 12. Thus, as shown in FIG. 1, if the frame 12 is put in an unlocked position so that it is free to laterally extend and contract, and then if the four tracks 34 are each steered laterally inward as shown in the intermediate position of FIG. 1 while the machine 10 moves forward in the direction 82 the lateral forces exerted by the tracks 34 on frame 12 will cause the male parts of the telescoping frame assemblies 26-32 to be telescopingly moved into the female parts of the telescoping frame assemblies, thus contracting the frame to a reduced lateral width 14 as seen in the upper position of FIG. 1.

In some instances it may be desired to extend or retract one of the side members 20 or 22 at a time. For example, if the machine starts in the orientation seen in the lower image of FIG. 1, and it is desired to retract only the right side member 22 to reach the orientation of FIG. 2, the locking mechanisms associated with the right side telescoping frame assemblies 30 and 32 would be unlocked and the locking mechanisms associated with the left side telescoping frame assemblies 26 and 28 would be locked. Then all four tracks 34A-34D could be steered inwardly as shown in FIG. 1 while the machine 10 moves forward, until the right side telescoping frame assemblies 30 and 32 are moved inward to the position of FIG. 2. Also it is noted that it is possible to create a telescoping inward retraction of the frame 12 by steering only the front and rear left tracks 34A and 34C inward or by steering only the front and rear right tracks 34B and 34D inward.

Figure 5:
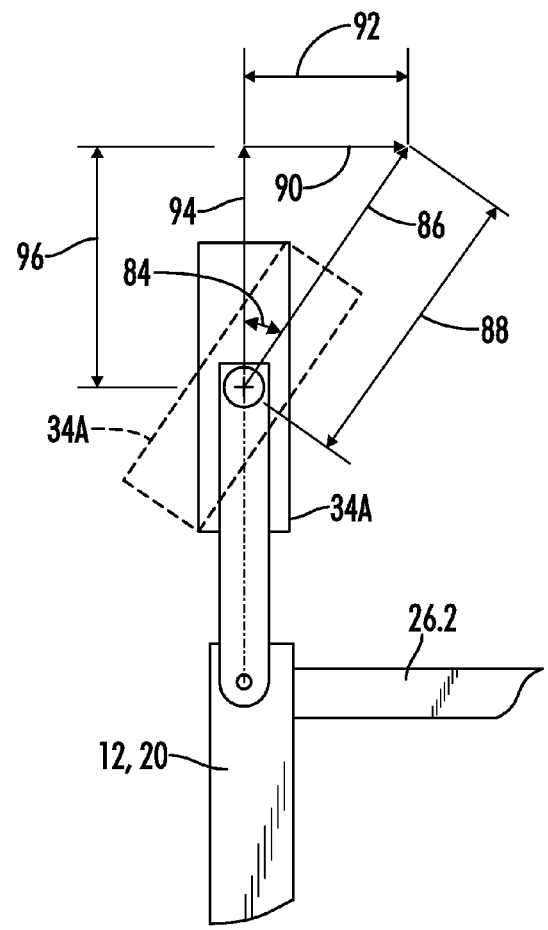
FIG. 5 is a schematic plan view similar to FIG. 4, and illustrating the forces imposed on the machine frame when the track is steered away from the direction of motion of the machine.

FIG. 5 schematically illustrates the force components when the track 34A is steered inwardly by a steering angle 84. In FIG. 5, the track 34A is shown in its initial forward extending orientation in solid lines, and steered clockwise through the angle 84 to a revised position shown in dotted lines in FIG. 5. With the track 34A oriented as shown in FIG. 5, and assuming no slippage of the crawler track 34A as it moves across the ground surface, as the crawler track 34A moves in the track steering direction 86 by a magnitude 88 there is a perpendicular or lateral movement component 90 having a magnitude 92 and a forward movement component 94 having a magnitude 96. It will be appreciated that as the track 34A advances in the track steering direction 86 by one unit of magnitude, the lateral component 90 of movement will be equal to the sine of angle 84, and the forward component 94 of movement will be equal to the cosine of angle 84.

FIG. 7 schematically illustrates, among other things, one embodiment of a hydraulic control diagram for operation of the steering cylinder 46A and of the hydraulic linear actuator 66 associated with the left front telescoping frame assembly 26. Also shown is a separate clamping device 60 as shown in FIG. 3 associated with the left front telescoping frame assembly 26. These various controls associated with the left front crawler tracks 34A may be collectively referred to as the left front ground engaging unit control system 98A. Schematically illustrated as 98B, 98C and 98D are the similar control systems associated with the right front crawler track 34B, the left rear crawler track 34C and the right rear crawler track 34D, respectively.

The steering cylinder 46A and the hydraulic ram 66 may each be double acting hydraulic cylinders. Hydraulic fluid under pressure is provided to the cylinders from a source such as hydraulic pump 100A, and fluid discharged from the cylinders is returned to a hydraulic reservoir 102A via a return line 104A. Individual pumps 100 and reservoirs 102 may be used for each crawler track or a common pump and reservoir may be used for multiple crawler tracks.

Directional control of hydraulic fluid into and out of the steering cylinder 46A is controlled by a first solenoid actuated variable flow three way servo-valve 104A, and control of fluid into and out of the hydraulic ram 66 is controlled by a second solenoid actuated variable flow three way servo-valve 106A.

Hydraulic fluid under pressure from pump 100A flows through a hydraulic fluid supply line 108A, to each of the variable flow three way servo-valves 104A and 106A. These variable flow valves may also be referred to as proportional valves. The valves 104A and 106A can control both the direction and the rate of flow of fluid to their respective hydraulic cylinders.

The three way valve 106A associated with the hydraulic ram 66 has a first position 110A wherein hydraulic fluid under pressure is provided to the left end of the cylinder via hydraulic line 112A and received from the right end of the cylinder via hydraulic line 114A for retraction of the piston 70 of the hydraulic ram 66. The three way valve 106A can be moved to a second position 116A in which the direction of flow is reversed to extend the piston 70. The three way valve 106A can be moved to a third position 126A wherein flow of hydraulic fluid to and from the hydraulic ram 66 is blocked. It is noted that the hydraulic lines 112A and 114A may be referred to as first and second hydraulic lines 112A and 114A, but such designation is for identification only and does not imply any specific functionality.

Also associated with the hydraulic ram 66 are first and second solenoid actuated bypass valves 128A and 130A connected to the hydraulic lines 112A and 114A. Each of the bypass valves can be selectively moved to either an open or a closed position as indicated. When in their open positions the bypass valves communicate both sides of the hydraulic ram 66 with the hydraulic reservoir 102A via the return line 104A.

Each of the hydraulic rams 66 and its associated three way valve 106 and bypass valves 128 and 130 may be referred to as a hydraulic control system or as a lock.

The construction machine 10 includes a controller 132, which may be part of a master control system of the machine 10, or may be a separate controller. The controller 132 receives input signals from various sensors such as the steering sensors 58A-58D and frame extension sensors 55A-55D.

It will be understood that the controller 132 may also receive other inputs such as the pivot angle of swing legs 36, the advance speed of machine 10, or other operational parameters of machine 10.

The controller 132 can control the volume and direction of hydraulic flow to and from the steering cylinder 46A and hydraulic ram 66 via control signals sent to three way valves 104A and 106A, respectively, over control lines 134A and 136A. The controller 132 can control the position of the bypass valves 128A and 130A via control signals sent over control lines 138A and 140A, respectively.

If three way valve 106A is in its blocked position 126A, and the bypass valves 128A and 130A are also in their blocked or closed positions, then the hydraulic ram 66 is hydraulically blocked so that it cannot move.

The hydraulic control system shown in FIG. 7 associated with hydraulic ram 66 has two alternative un-blocked positions.

In a first un-blocked position, if three way valve 106A is in its closed position 126A, and the bypass valves 128A and 130A are in their open positions, the hydraulic ram 66 is unblocked and is free to be moved by any force including but not limited to the action of the crawler tracks 34. This may be described as a free floating arrangement for the hydraulic ram 66.

In a second un-blocked position, if the three way valve 106A is in either of its positions 110A or 116A, and the bypass valves 128A and 130A are in their closed positions, then the motion of the hydraulic ram 66 can be actively facilitated by hydraulic power, or can be forced by hydraulic power, depending upon the volume of fluid supplied by pump 100A under the control of controller 132.

Similarly, the three way valve 104A associated with the steering cylinder 46A defines first and second positions 142A and 144A controlling the direction of flow to and from the steering cylinder 46A, and a third position 146A in which flow to and from the steering cylinder 46A is blocked so as to hold or maintain a given steering position of the crawler track 34A relative to the machine frame 12.

Figure 7A:
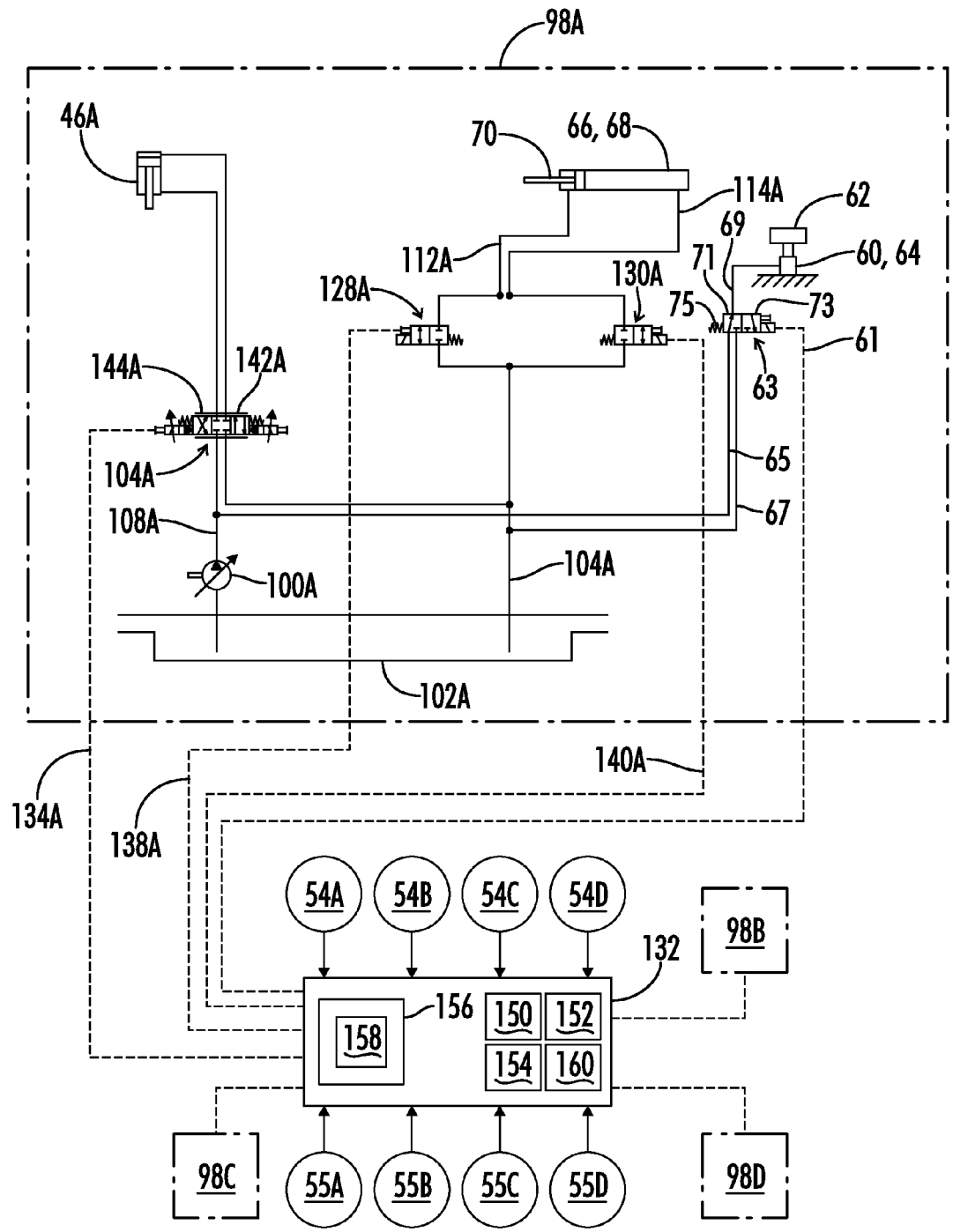
FIG. 7A is a schematic illustration similar to FIG. 7 showing an alternative embodiment of the hydraulic control system for blocking and unblocking the lateral extension of the machine frame.

FIG. 7A is similar to FIG. 7 and illustrates a first alternative embodiment of the hydraulic control system associated with the hydraulic ram 66. In the embodiment of FIG. 7A the three way valve 106A of FIG. 7 has been eliminated so that the locking and unlocking of the hydraulic ram 66 is controlled solely by the bypass valves. This provides what may be referred to as a free floating arrangement of the hydraulic ram 66. For example, the ram 66 and bypass valves 128A and 130A, along with the various hydraulic lines connected thereto may be referred to as a lock or hydraulic control system associated with the left front telescoping frame assembly 26. That hydraulic control system may be described as including the first hydraulic ram 66 having a piston and a cylinder, the piston dividing the cylinder into first and second ends. First and second hydraulic lines 112A and 114A connect the fluid reservoir 104A to the first and second ends of the cylinder. The first and second bypass valves 128A and 130A are connected to the hydraulic lines 112A and 114A, respectively. Each bypass valve has a blocked position and a bypass position, the bypass position communicating the respective end of the hydraulic ram 66 to the fluid reservoir 102A. In the hydraulically blocked position of the hydraulic control system, the first and second bypass valves 128A and 130A are in their blocked positions. In the hydraulically un-blocked position of the hydraulic control system the first and second bypass valves 128A and 130A are in their bypass positions. With this arrangement, when in the un-blocked position, the left front telescoping assembly 26 is free to be telescoped inward or outward by the forces created by engagement of the track 34A with the ground, or with any other forces imposed on the frame 12, but there is no active facilitation of the extension or retraction of frame 12 by the hydraulic ram 66.

Figure 7B:
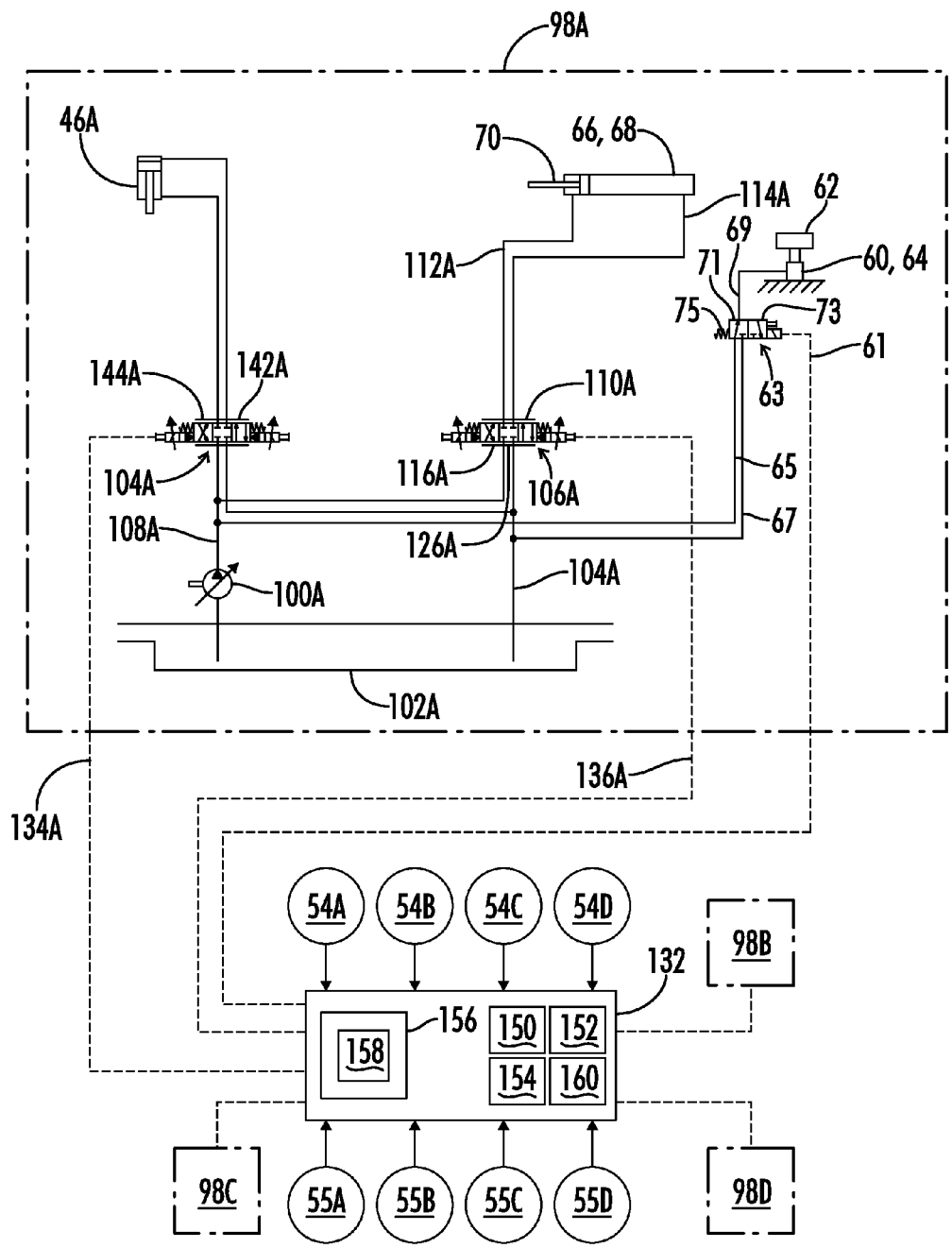
FIG. 7B is a schematic illustration similar to FIG. 7 showing another alternative embodiment of the hydraulic control system for blocking and unblocking the lateral extension of the machine frame.

FIG. 7B is similar to FIG. 7 and illustrates a second alternative embodiment of the hydraulic control systems associated with the hydraulic ram 66. In the embodiment of FIG. 7B the bypass valves have been eliminated so that the locking and unlocking of the hydraulic ram 66 is controlled solely by the three way valve 106A. This provides what may be referred to as a stroke controlled arrangement of the hydraulic ram 66. For example, the ram 66 and three way valve 106A along with the various hydraulic lines connected thereto may be referred to as a lock or hydraulic control system associated with the left front telescoping assembly 26. That hydraulic control system may be described as including the hydraulic ram 66 having a piston and a cylinder, the piston dividing the cylinder into first and second ends. The three way valve 106A has an extension position 110A, a retraction position 116A, and a blocked position 126A. The hydraulic lines 112A and 114A connect the three way valve 106A to the first and second ends of the cylinder. The supply line includes supply line 108A and a selected one of the lines 112A and 114A, and the return line includes the return line 104A and the other of the lines 112A and 114A. In the hydraulically blocked position of the hydraulic control system the three way valve 106A is in the blocked position 126A. In the hydraulically un-blocked position of the hydraulic control system, the three way valve 106A is in either its extension or retraction position 110A or 116A, and the controller 132 is configured such that the hydraulic ram 66 actively facilitates the extension or retraction of left front telescoping assembly 26. The controller 132 may determine a specific amount of desired movement of the telescoping frame assembly 26 via an algorithm, and the controller 132 may exactly control the stroke or extension of the hydraulic ram 66, which is monitored via the frame extension sensor 55A. The algorithm preferably calculates the exact movement of the frame 12 and telescoping assemblies 26 and 56 which will result from the steering of the track 34A, and then actively facilitates the movement of the swing leg by that same amount. It will be understood that with this arrangement, if the algorithm is slightly in error it is the stroke imparted to the hydraulic ram 66 that will control the final extended position of the telescoping frame assembly 26.

Figure 7C:
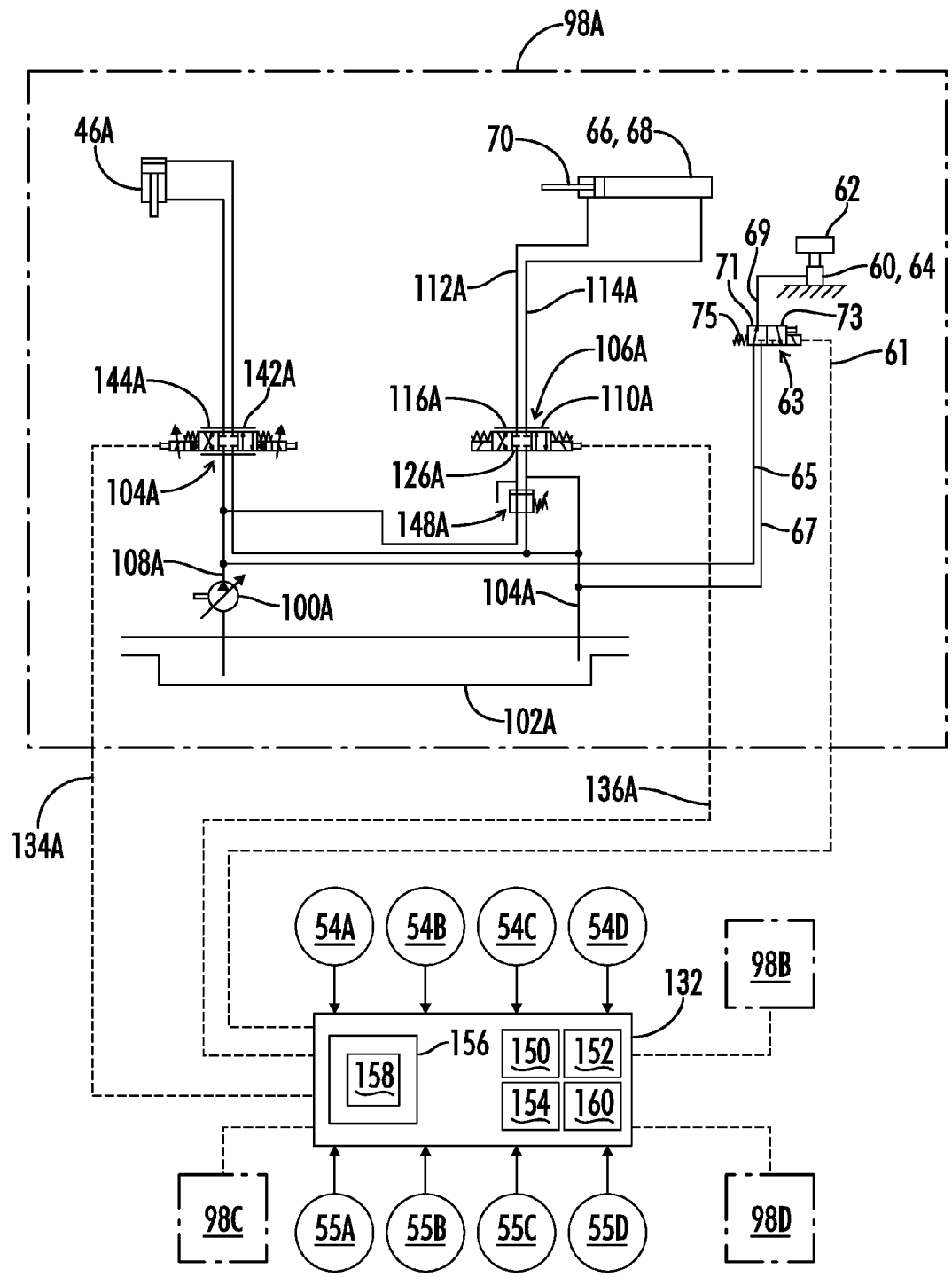
FIG. 7C is a schematic illustration similar to FIG. 7 showing another alternative embodiment of the hydraulic control system for blocking and unblocking the lateral extension of the machine frame.

FIG. 7C is similar to FIG. 7 and illustrates a third alternative embodiment of the hydraulic control systems associated with the hydraulic ram 66. In the embodiment of FIG. 7C the bypass valves have been eliminated and the three way valve 106A has been modified to be a simpler and less expensive three way valve that is not a servo-valve. Also, a pressure control valve 148A has been added in the fluid supply line 108A upstream of the three way valve 106A. With this arrangement the controller 132 is configured such that the active facilitation of the extension and retraction of telescoping assembly 26 by the hydraulic ram 66 is limited to providing a hydraulic pressure to the hydraulic ram 66 controlled by the pressure control valve 148A.

The arrangement of FIG. 7C provides what may be referred to as a pressure controlled arrangement of the hydraulic ram 66. For example, the ram 66 and three way valve 106A along with the various hydraulic lines connected thereto may be referred to as a lock or hydraulic control system associated with the telescoping frame assembly 26. That hydraulic control system may be described as including the hydraulic ram 66 having a piston and a cylinder, the piston dividing the cylinder into first and second ends. The three way valve 106A has an extension position 110A, a retraction position 116A, and a blocked position 124A. Hydraulic lines 112A and 114A connect the three way valve 106A to the first and second ends of the cylinder. The supply line includes supply line 108A and a selected one of the lines 112A and 114A, and the return line includes the return line 104A and the other of the lines 112A and 114A. In the hydraulically blocked position of the hydraulic control system the three way valve 106A is in the blocked position 126A. In the hydraulically un-blocked position of the hydraulic control system, the three way valve 106A is in either its extension or retraction position 110A or 116A, and the controller 132 is configured such that the hydraulic ram 66 actively facilitates the extension or retraction of telescoping frame assembly 26 by supplying a pressure to the selected end of the hydraulic ram 66 controlled by the pressure control valve 148A. It will be understood that with this arrangement, the steering of the track 34A will control the final position of the telescoping assembly 26, and the pressure provided via the three way valve 106A and pressure control valve 148A will merely help overcome frictional resistance to that telescoping movement.

Controller 132 includes a processor 150, a computer readable memory medium 152, a data base 154 and an input/output module or control panel 156 having a display 158.

The term "computer-readable memory medium" as used herein may refer to any non-transitory medium 152 alone or as one of a plurality of non-transitory memory media 152 within which is embodied a computer program product 160 that includes processor-executable software, instructions or program modules which upon execution may provide data or otherwise cause a computer system to implement subject matter or otherwise operate in a specific manner as further defined herein. It may further be understood that more than one type of memory media may be used in combination to conduct processor-executable software, instructions or program modules from a first memory medium upon which the software, instructions or program modules initially reside to a processor for execution.

"Memory media" as generally used herein may further include without limitation transmission media and/or storage media. "Storage media" may refer in an equivalent manner to volatile and non-volatile, removable and non-removable media, including at least dynamic memory, application specific integrated circuits (ASIC), chip memory devices, optical or magnetic disk memory devices, flash memory devices, or any other medium which may be used to stored data in a processor-accessible manner, and may unless otherwise stated either reside on a single computing platform or be distributed across a plurality of such platforms. "Transmission media" may include any tangible media effective to permit processor-executable software, instructions or program modules residing on the media to be read and executed by a processor, including without limitation wire, cable, fiber-optic and wireless media such as is known in the art.

The term "processor" as used herein may refer to at least general-purpose or specific-purpose processing devices and/or logic as may be understood by one of skill in the art, including but not limited to single- or multithreading processors, central processors, parent processors, graphical processors, media processors, and the like.

The controller 132 receives input data from the sensors 54A-D and 55A-D. The controller also receives other inputs such as the pivot angles of the swing legs, the track speed and magnitude of movement. Based upon the programming 160 the controller 132 can calculate the lateral movement components 90 resulting from any given steering inputs to the tracks 34. Such calculations may be based upon the geometry of the system shown in FIG. 5 as previously described.

As seen in FIG. 5, as the track 34A advances in the track steering direction 86 by one unit of magnitude, the lateral component 90 of movement will be equal to the sine of angle 84, and the forward component of movement 94 will be equal to the cosine of angle 84. The controller 132 can monitor track speed and thus determine the magnitude of movement 86 and the magnitude of the lateral component 90.

Knowing the magnitude of the lateral component 90, the change in the relative telescoping position of male and female parts of left front telescoping frame assembly 26 can then be calculated.

Figure 8:
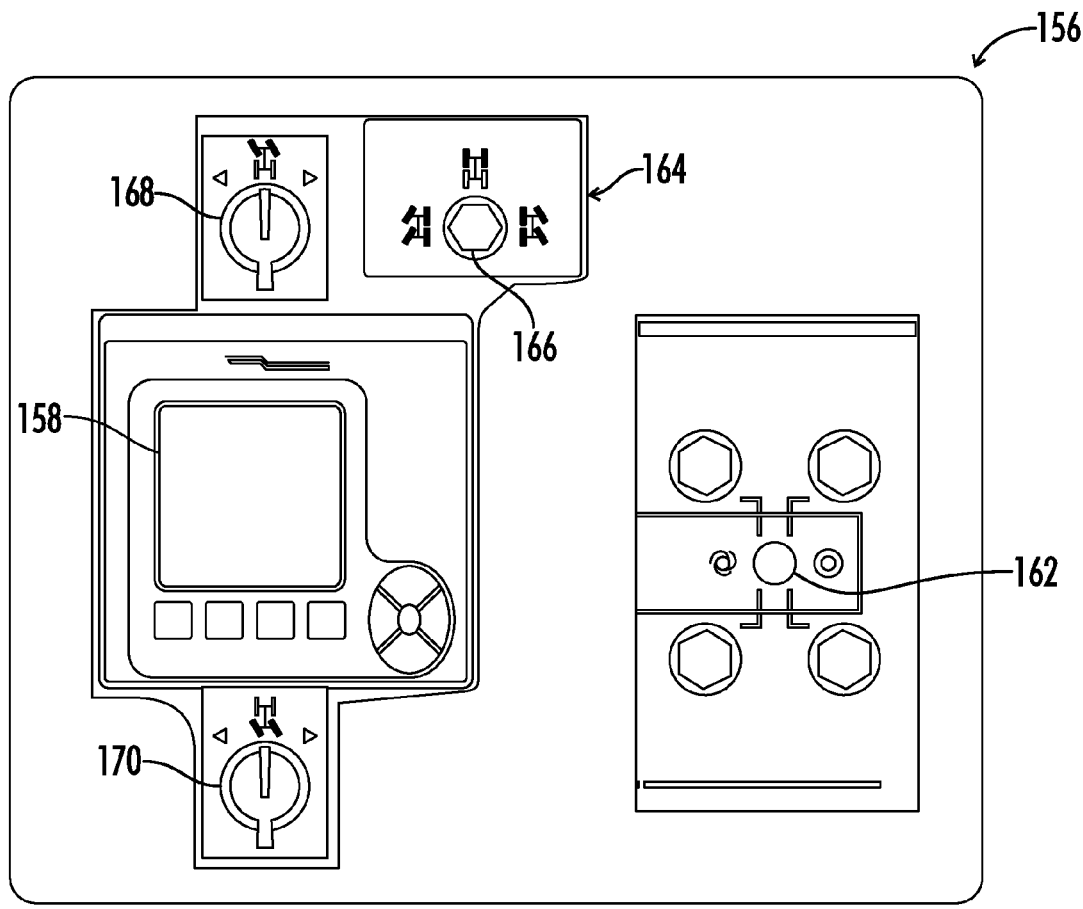
FIG. 8 is a schematic view of the control panel of the controller of FIG. 7.

FIG. 8 is a schematic view of the control panel 156. It will be understood that the control panel 156 as shown in FIG. 8 is simplified to show only the controls of interest, and control panel 156 will typically include many controls other than those shown. Also, the control panel 156 may comprise one consolidated control panel for all the controls shown, or those controls may be distributed among two or more control panels.

Figure 9:
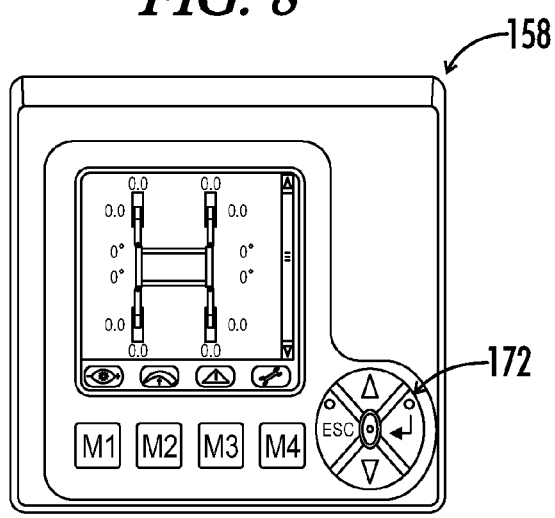
FIG. 9 is an enlarged view of the display screen and certain ones of the input controls for the control panel of FIG. 8.

FIG. 9 is a schematic view of the display unit 158 of the control panel 156.

The controller 132 includes a frame extension mode configured to allow each of the left and right frame sides 20 and 22 to move relative to the main frame module 24 of the machine frame in response to steering of the crawler tracks 34 associated with the side member. The frame extension mode may be selected by pressing the control button 162. The frame extension mode may be implemented in either a manual sub-mode or an automatic sub-mode. It is noted that the "manual" sub-mode still involves the controller in part to implement the control of the machine. The term "manual" sub-mode just means that there is a real-time manual aspect of the control in that a human operator is providing a steering input via a steering knob or steering stick or the like to direct the steering in real time. The controller may be assisting in that "manual" sub-mode, for example by causing a related opposite steering motion of a right side track when the human operator manually directs the steering of the left side track. That is contrasted to the "automatic" sub-mode in which the human operator may simply input a set value identifying a desired end result, and the subsequent steering motions may be entirely implemented by the controller.

Upon initiation of the frame extension mode upon pressing of button 162, the frame extension mode will be in the manual sub-mode, unless the automatic sub-mode is selected by further inputs to the control panel 156.

In the manual sub-mode, the frame extension mode includes a ground engaging unit selection feature 164 allowing an operator to select individual steering control of either the left side crawler tracks 34A and 34C, or the right side crawler tracks 34B and 34D or synchronous steering control of both of the left and right side crawler tracks via three way switch 166, as graphically shown in FIG. 8. After selection of steering of the left tracks or right tracks or both, the actual steering input to the selected front track(s) is accomplished by twisting of the forward track steering control 168.

The frame extension mode may be described as a configuration of the controller 132 configured to steer at least one of the ground engaging units 34 to provide a lateral force to adjust the width 14 of the machine frame 12 as the machine 10 is driven across the ground surface by the ground engaging units 34. In the embodiment illustrated, both left side tracks will always be steered in tandem in the same direction, and both right side tracks will always be steered in tandem in the same direction.

It will be understood that in the manual sub-mode, if the operator has selected steering of the left side tracks, and then steers the front left track via control knob 168, the controller 132 will cause both the left front crawler track 34A and the left rear crawler track 34C to be steered in tandem at the same angle in the same direction as shown for example in the intermediate position of FIG. 1.

If the operator has selected the middle position on selector switch 166, the system will relate the steering input from the operator to the left front track. Thus the operator may then steer the left front track 34A with input knob 168, and the controller 132 will cause both left side tracks to steer inwardly to the right, and both right side tracks to steer inwardly to the left, as schematically illustrated in the intermediate position of FIG. 1.

If the operator chooses to steer only the right side tracks by choosing the right side position with selector switch 166, and then inputs a steering control to the right front track with control knob 168, the controller 132 will cause the two right side tracks 34B and 34D to steer in tandem at equal angles in the same direction.

To perform synchronous steering in the automatic sub-mode, command inputs may be made to the control panel 156 through the various mode selection buttons M1-M4 and the input control 172 as best seen in FIG. 9. Inputs to the input controls 172 may quantitatively define a desired change in the transverse width 14 of the machine frame 12. Inputs to the input controls 172 may define a desired absolute frame width 14, or a positive or negative change in frame width 14, or any other geometrically defined parameter of the positioning of the tracks and the members of the adjustable width frame 12. The processor 132 may then implement algorithms contained in the program 160 to cause the tracks 34 to steer for example so as to traverse a desired path such as the S-curve illustrated in FIG. 1, or any other curve. In performing the S-shaped curve of FIG. 1 each track is steered along the ground surface beginning at a zero steering angle 84 parallel to the forward direction 82 and then steering first away from and then back toward the forward direction 82 until the crawler track is again parallel to the forward direction 82 or to any other desired steering direction. The other desired steering direction may be example be a direction of the track 34 corresponding to a current direction of the machine 10 which may have changed during the process of adjusting the frame width, if the machine 10 is moving for example along a curved path.

When synchronous steering control of the tracks 34 is selected, the ground engaging unit selection feature is configured to steer the left side tracks in an opposite direction from the right side tracks. Thus, as shown in FIG. 1 when it is desired to reduce the lateral width 14 of the machine frame 12, the left side tracks and the right side tracks are steered toward each other. If, however, it is desired to extend the width 14 of the machine frame 12, the left side tracks and the right side tracks will be steered away from each other.

Although it is possible in some situations to steer only the front or rear track associated with either the left side 20 or right side 22 of the frame 12, it is generally preferable to simultaneously steer the front and rear track associated with the respective frame side in tandem and in the same direction.

The apparatus described above provides great flexibility in the control of the frame width adjustment. For example, if the machine 10 is provided with both the linear actuators such as 66 and 76 shown in FIG. 6, and the separate clamping devices 60 such as shown in FIG. 3, the operator may choose to use either the clamping devices 60 or the linear actuators such as 66 and 76 as the locking mechanisms to determine whether the width 14 of the frame 12 can be adjusted.

Various modes for operation of the linear actuators 66 and 76 as locking devices have been described above with regard to FIGS. 7-7C.

Additionally, if the machine 10 is provided with the linear actuators such as 66 and 76, the linear actuators 66 and 76 may be utilized to provide powered lateral extension and retraction of the machine frame 12 to adjust the frame width 14. The linear actuators 66 and 76 may work in tandem with the steering of the tracks 34 to provide for rapid and controlled adjustment of the frame width 14 as the machine 10 moves across the ground surface.

The operation of the various locking mechanisms and/or the active facilitation of the extension and retraction operation using the linear actuators 66 and 76 may be controlled by individual operator inputs at the control panel 156 and/or those operations may be automatically controlled by the controller 132 in response to the computer programming 160. In either event, after the adjustment of the frame width 14 is concluded, the locking mechanisms associated with the adjustable width frame 12 should be placed in their locked positions.

During any of the steering operations described above, when the frame width is being adjusted, the associated hydraulic rams such as 66 and 76 may be placed in an unblocked position, which may be described as deactivating the hydraulic rams or linear actuators, or as unlocking the hydraulic rams, so that the hydraulic rams do not resist the telescoping motion of the male and female telescoping parts. For example, in the embodiment of FIG. 7, hydraulic ram 66 may be placed in an unblocked position by closing three way valve 106A and opening the bypass valves 128A and 130A.

After the steering operation is complete and the frame width is at the desired final value, the associated hydraulic rams 66 and 76 may be activated by placing the hydraulic rams in a blocked position to hold or lock the telescoping assemblies in the revised position. For example, in the embodiment of FIG. 7, the hydraulic ram 66 may be placed in the blocked position by closing three way valve 106A and closing the bypass valves 128A and 130A.

Alternatively, in the embodiment of FIG. 7, during the steering operation the hydraulic ram 66 may be placed in one of the activated positions 110A or 116A to retract or extend the piston 70 so as to actively facilitate the telescoping of the machine frame. To accomplish such active facilitation of the hydraulic ram 66, the bypass valves 128A and 130A are placed in their closed positions, and the three way valve 106A is moved to either its position 110A or 116A. The flow rate of hydraulic fluid directed to the hydraulic ram 66 may be controlled by the three way valve 106A.

The hydraulic ram 66 may be described as a hydraulic actuator 66 connected between the male telescoping part 26.2 and the female telescoping part 26.1, and configured to change in length as the machine frame 12 changes in width. The valves associated with the hydraulic actuator 66 can be switched so that the hydraulic actuator is in a hydraulically blocked position as described above preventing a change in width of frame 12 or a hydraulically unblocked position as described above permitting a change in width of the frame 12.

The controller 132 may be configured such that the hydraulic actuator or ram 66 associated with each telescoping frame assembly is placed in an unblocked position prior to steering of the tracks 34.

The controller 132 may be configured such that upon deactivation of the frame extension mode, the valves associated with the hydraulic actuators or rams 66 are in their blocked positions.

Controlling Relative Telescoping Extension

One issue which may be encountered in the apparatus and methods described above for extension and retraction of the frame 12 is the problem of controlling relative telescoping extension of multiple telescoping assemblies. This issue may be encountered in any one of several situations, including the following:

1. In a situation like that illustrated in FIGS. 1 and 2 where one of the frame side members 20 or 22 is to be extended or retracted, it is desirable that each of the front and rear telescoping assemblies associated with that side member extend or retract by essentially equal amounts so as to keep the frame side member substantially parallel to the main frame 24.

2. Also, in the situation illustrated in FIGS. 1 and 2, it is necessary to control which of the left and/or right frame members 20 and 22 is extended or retracted when an extension or retraction force is applied to both of the frame side members 20 and 22.

3. Also, when using a double telescoping assembly such as that shown in FIG. 3A, where a common extension or retraction force is applied across the double telescoping assembly, it is necessary to control whether the part 26.2 moves within the part 26.1, or the part 26.3 moves within the part 26.2.

All three of the situations described above may be described as the control of relative telescoping extension of multiple telescoping assemblies when a common telescoping force is applied to the multiple telescoping assemblies. It will be understood that in the following disclosure, when reference is made to "monitoring extension" or to "measuring extension" or to "controlling extension", such phrases are referring to the degree of extension and include monitoring, measuring or controlling the telescoping assemblies as they extend or retract.

These various arrangements of multiple telescoping assemblies may be further described as being arranged parallel to each other or in series with each other. For example, in the arrangement illustrated in FIGS. 1 and 2 the left front telescoping assembly 26 and the left rear telescoping assembly 28 may be described as being parallel to each other. Thus, an inward or outward force applied to left side frame member 20 would be applied in part to each of the left front telescoping assembly 26 and left rear telescoping assembly 28. Similarly, the right front telescoping assembly 30 and right rear telescoping assembly 32 may be described as being parallel to each other.

On the other hand, the two left side telescoping assemblies 26 and 28 may be described as being in series with the two right side telescoping assemblies 30 and 32.

Similarly, in the arrangement illustrated in FIG. 3A, which shows schematically a double telescoping assembly, the double telescoping assembly may be described as comprising or being made of two telescoping assemblies in series. The outer telescoping part 26.1 and intermediate telescoping part 26.2 can be described as a first telescoping assembly. The intermediate telescoping part 26.2 and the inner telescoping part 26.3 can be described as a second telescoping assembly. The first and second telescoping assemblies may be described as being in series with each other. When two telescoping assemblies are described as being in series, a force applied across the telescoping assemblies is applied in whole to each telescoping part in the series through which the force must pass. The two telescoping assemblies can have respective extension sensors 55E and 55F associated therewith.

When there are multiple telescoping assemblies which are subjected to a common extension or retraction force, it is desirable to provide a mechanism by which an operator or controller can control which of the telescoping assemblies moves in response to the applied force. This can be accomplished by having a telescopic lock, such as for example one of the clamp assemblies 60, associated with each telescoping assembly.

It is also noted that if the slipform paver is equipped with the linear actuators such as 66 and 76 associated with the telescoping assemblies, such as 26 and 30, like seen in FIG. 6, those linear actuators may function as telescopic locks to lock their respective telescoping assemblies in a selected position.

It is further desirable to provide an extension sensor, such as sensors 55A-55D, associated with each telescoping assembly. This allows the extension of each of the telescoping assemblies to be monitored, and for control to be provided to control telescoping motion by activation of the telescopic locks associated with each telescoping assembly.

Thus, in the situation such as illustrated in FIG. 2, assuming that it is desired to move the left side frame member 20 inward toward the main frame 24, the left front telescoping assembly 26 and the left rear telescoping assembly 28 constitute two telescoping assemblies arranged in parallel. When a retraction force is applied to the left side frame member 22 by steering of the left side tracks 34A and 34C it is desired to maintain the left side frame member 20 substantially parallel to the main frame 24 as it is retracted. By monitoring the retraction of the telescoping assemblies 26 and 28, respectively, with extension sensors 55A and 55C (see FIGS. 6 and 7) it can be determined if one of the telescoping members is retracting more than the other. If such a situation is encountered the controller may cause the telescopic lock 60 associated with one of the telescoping members to lock while leaving the telescopic lock 60 associated with the other telescopic assembly unlocked, so as to bring the side member 20 back into a substantially parallel relationship to the main frame 24.

In another situation, where perhaps both side frame members 20 and 22 are in the extended position of FIG. 1, and it is desired to move only the right side frame member 22 to a retracted position as shown in FIG. 2, the controller may lock the telescopic locks 60 associated with the two left side telescopic assemblies 26 and 28, while unlocking the telescopic locks 60 associated with each of the right side telescopic assemblies 30 and 32, thus allowing the relative force that is applied between the left and right side frame members 20 and 22 to cause only the right side frame member 22 to be retracted. It is noted that the relative force can be applied between the left and right side frame members by steering either the left side tracks inward, or the right side tracks inward, or both.

In yet another example, such as the double telescopic member illustrated in FIG. 3A, a common extension or retraction force applied across the three mutually telescoping parts 26.1, 26.2 and 26.3 can be utilized to extend or retract either the intermediate part 26.2 within the outer part 26.1, or the inner part 26.3 within the intermediate part 26.2, by selective activation of the clamping devices 60. Furthermore by monitoring extension via extension sensors 55E and 55F, after a desired extension or retraction of one of the telescoping parts is achieved, that part may be clamped in place and then the other telescopic part may be allowed to extend or retract.

The controller may also simultaneously control multiple ones of the situations described above. For example, in the embodiment illustrated in FIGS. 1 and 2, all of the telescoping assemblies may be double telescoping assemblies like shown in FIG. 3A. The controller can simultaneously control each of the double telescoping assemblies while also controlling relative motion of the front and rear telescoping assemblies or the left and right telescoping assemblies.

Thus it is seen that the apparatus and methods of the present invention readily achieve the ends and advantages mentioned as well as those inherent therein. Although certain preferred embodiments of the invention have been illustrated and described for purposes of the present disclosure, numerous changes in the arrangement and construction of parts and steps may be made by those skilled in the art, which changes are encompassed within the scope and spirit of the present invention as defined by the appended claims.

What is claimed is:

1. A construction machine, comprising:
   a machine frame having a front, a back, a left side and a right side, the machine frame being laterally extendible to adjust a width of the machine frame;
   at least one left side ground engaging unit steerably connected to the left side of the machine frame;
   at least one right side ground engaging unit steerably connected to the right side of the machine frame;
   each of the ground engaging units including a drive motor configured such that each ground engaging unit is driven across a ground surface by its respective drive motor;
   a frame lock configured to selectively lock and unlock the machine frame, such that when the frame lock is locked the machine frame cannot laterally extend, and when the frame lock is unlocked the machine frame can laterally extend; and
   a controller including a frame extension mode, the frame extension mode being configured to provide steering of at least one of the ground engaging units to provide a lateral force to adjust the width of the machine frame as the machine is driven across the ground surface by the ground engaging units.

2. The machine of claim 1, wherein:
   the frame extension mode includes a ground engaging unit selection feature allowing an operator to select individual steering control of either of the left and right ground engaging units or synchronous steering control of both the left and right ground engaging units.

3. The machine of claim 2, wherein:
   the synchronous steering control of the ground engaging unit selection feature is configured to steer the left and right ground engaging units in opposite directions.

4. The machine of claim 1, wherein:
   the at least one left side ground engaging unit includes a front and a rear left side ground engaging unit, and the controller is configured to simultaneously steer the front and rear left side ground engaging units in tandem and in the same direction; and
   the at least one right side ground engaging unit includes a front and a rear right side ground engaging unit, and the controller is configured to simultaneously steer the front and rear right side ground engaging units in tandem and in the same direction.

5. The machine of claim 1, further comprising:
   at least one linear actuator connected to the machine frame and arranged actively facilitate lateral extension and retraction of the machine frame to adjust the frame width.

6. The machine of claim 5, wherein:
   the frame lock is provided by the linear actuator.

7. The machine of claim 5, wherein:
   the frame lock is a separate component from the linear actuator.

8. The machine of claim 5, wherein:
   the linear actuator comprises a hydraulic ram including a cylinder and a piston, the piston dividing the cylinder into first and second ends; and the machine further comprises:
a three way valve having an extension position, a retraction position, and a blocked position;
first and second hydraulic lines connecting the three way valve to the first and second ends of the cylinder;
wherein when the three way valve is in its blocked position the hydraulic ram is hydraulically blocked from movement.

9. The machine of claim 8, wherein:
the controller is operably associated with the three way valve and the controller is configured to effect movement of the three way valve between its positions and to control the flow of hydraulic fluid provided to the hydraulic ram via the three way valve.

10. The machine of claim 9, wherein:
the controller is configured to determine the lateral extension of the machine frame resulting from the steering of the ground engaging units in accordance with an algorithm, and to actively facilitate the lateral extension by controlling the volume of hydraulic fluid provided to the hydraulic ram via the three way valve.

11. The machine of claim 10, wherein:
the controller is configured to control an absolute magnitude of lateral extension of the frame.

12. The machine of claim 8, wherein:
the machine further comprises a hydraulic fluid supply line to the three way valve and a pressure control valve in the supply line; and
the controller is configured to control the pressure of hydraulic fluid provided to the hydraulic ram via the three way valve.

13. The machine of claim 5, wherein:
the machine frame includes male and female laterally telescoping frame parts; and
the frame lock is a separate component from the linear actuator and the frame lock engages the male and female telescoping frame parts.

14. The machine of claim 13, wherein:
the controller is configured to control operation of the frame lock.

15. The machine of claim 5, wherein:
the at least one left side ground engaging unit includes a front and a rear left side ground engaging unit;
the at least one right side ground engaging unit includes a front and a rear right side ground engaging unit;
the machine frame includes a left front laterally telescoping frame assembly, a right front laterally telescoping frame assembly, a left rear laterally telescoping frame assembly, and a right rear laterally telescoping frame assembly; and
the at least one linear actuator includes a left front linear actuator, a right front linear actuator, a left rear linear actuator and a right rear linear actuator associated with the left front laterally telescoping frame assembly, the right front laterally telescoping frame assembly, the left rear laterally telescoping frame assembly, and the right rear laterally telescoping frame assembly, respectively.

16. The machine of claim 5, wherein:
the at least one left side ground engaging unit includes a front and a rear left side ground engaging unit;
the at least one right side ground engaging unit includes a front and a rear right side ground engaging unit;
the machine frame includes at least one front laterally telescoping assembly and at least one rear laterally telescoping assembly; and
the at least one linear actuator is located midway between the front and rear laterally telescoping assemblies.

17. The machine of claim 1, wherein:
the frame extension mode is configured such that upon deactivation of the frame extension mode the frame lock is in its locked position.

18. The machine of claim 1, wherein:
the machine frame includes a telescoping assembly having first and second laterally telescoping frame parts; and
the frame lock further includes:
a hydraulic cylinder and piston connected between the first and second laterally telescoping frame parts, the piston dividing the hydraulic cylinder into first and second ends;
a hydraulic fluid reservoir;
first and second hydraulic lines connecting the first and second ends of the hydraulic cylinder to the reservoir; and
first and second bypass valves connected to the first and second hydraulic lines, each bypass valve having a blocked position blocking its respective hydraulic line and a bypass position communicating its respective end of the hydraulic cylinder to the reservoir.

19. The machine of claim 1, wherein:
the controller is configured such that the frame extension mode includes a manual sub-mode permitting the ground engaging units to be steered under manual control by a machine operator.

20. The machine of claim 1, wherein:
the controller is configured such that the frame extension mode includes an automatic sub-mode in which the steering is automatically controlled by the controller in response to an operator input corresponding to a desired frame extension.

21. The machine of claim 20, wherein:
in the automatic sub-mode the controller causes the at least one ground engaging unit which is to be steered to be steered in an S-curve along the ground surface beginning parallel to an initial direction of the ground engaging unit that is to be steered, then steering away from and then back toward the initial direction.

22. The machine of claim 1, wherein the machine is a slipform paving machine.

23. The machine of claim 1, wherein the ground engaging units comprise crawler tracks.

24. The machine of claim 1, further comprising:
at least one left side steering sensor to detect a steering angle for the at least one ground engaging unit steerably connected to the left side of the machine frame;
at least one right side steering sensor to detect a steering angle for the at least one ground engaging unit steerably connected to the right side of the machine frame; and
wherein the controller is operably associated with the left and right side steering sensors to receive input signals from the left and right side steering sensors.

25. The machine of claim 1, further comprising:
at least one frame extension sensor configured to sense an amount of lateral extension of the frame.

26. A method of operating a self-propelled construction machine, the machine including a machine frame, the machine frame being laterally extendible to adjust a width of the machine frame, at least one left side ground engaging unit steerably connected to a left side of the machine frame, at least one right side ground engaging unit steerably connected to a right side of the machine frame, each of the ground engaging units including a drive motor, and a frame lock configured to selectively lock and unlock the machine frame, the method comprising:

(a) unlocking the frame lock such that the machine frame can laterally extend and contract; and (b) while the frame lock is unlocked, moving the machine across the ground surface and steering at least one of the left and right ground engaging units such that the frame width changes due to a lateral component of direction of the at least one of the left and right ground engaging units.

27. The method of claim 26, further comprising:

after the frame width changes, locking the frame lock.

28. The method of claim 26, wherein:

step (b) further comprises steering the other of the left and right ground engaging units in a steering direction opposite to that of the one of the left and right ground engaging units.

29. The method of claim 28, wherein the left and right ground engaging units are steered toward each other.

30. The method of claim 28, wherein the left and right ground engaging units are steered away from each other.

31. The method of claim 26, wherein the frame lock comprises a linear actuator configured to laterally extend and retract the machine frame; and wherein step (a) comprises de-activating the linear actuator so that the linear actuator does not resist the change of the frame width during step (b).

32. The method of claim 31, further comprising:

after the frame width changes, locking the frame lock by activating the linear actuator.

33. The method of claim 26, wherein the frame lock comprises a linear actuator configured to laterally extend and retract the machine frame; and wherein during step (b), the linear actuator actively facilitates the change of the frame width.

34. The method of claim 33, wherein:

during step (b), the at least one of the left and right ground engaging units is steered under control of an automatic controller in response to an operator input, and the linear actuator causes an absolute quantity of change of frame width as determined by the controller according to an algorithm.

35. The method of claim 33, the linear actuator including a hydraulic ram and a pressure control valve in a supply line to the hydraulic ram, and wherein:

during step (b), the at least one of the left and right ground engaging units is steered under control of an automatic controller, and the controller is configured such that the active facilitation of the change of frame width by the linear actuator is limited to providing a hydraulic pressure to the hydraulic ram controlled by the pressure control valve.

36. The method of claim 26, wherein:

in step (b), the at least one of the left and right ground engaging units is steered under control of an automatic controller in an S-curve beginning parallel to an initial direction of the one ground engaging unit, then away from and then back toward the initial direction.

37. The method of claim 26, wherein:

in step (b), the at least one of the left and right ground engaging units is steered under control of an automatic controller in response to an operator input corresponding to a final frame width.

38. The method of claim 26, wherein:

in step (b), the at least one of the left and right ground engaging units is steered under manual control by a machine operator.

39. The method of claim 26, wherein the ground engaging units comprise crawler tracks.

40. The method of claim 26, wherein the construction machine is a slipform paving machine.

41. The method of claim 26, wherein:

the at least one left side ground engaging unit includes a front and a rear left side ground engaging unit, and the at least one right side ground engaging unit includes a front and a rear right side ground engaging unit; and in step (b) an automatic controller simultaneously steers the front and rear ground engaging units of each side in tandem and in the same direction.

42. The method of claim 41, wherein:

in step (a) the frame lock is controlled by the automatic controller.

* * * * *